(12) United States Patent
Jurkowski (10) Patent No.: US 8,704,422 B2
(45) Date of Patent: Apr. 22, 2014

(54) FULL ROUND STATOR ASSEMBLY AND ELECTROMAGNETIC MACHINE HAVING HIGH SLOT FILL

(75) Inventor: Jason Jurkowski, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 284 days.

(21) Appl. No.: 12/949,292

(22) Filed: Nov. 18, 2010

(65) Prior Publication Data

US 2012/0126659 A1    May 24, 2012

(51) Int. Cl.
  *H02K 15/12* (2006.01)
  *H02K 1/14* (2006.01)
(52) U.S. Cl.
  USPC ............. 310/216.009; 310/216.074; 29/596
(58) Field of Classification Search
  USPC ................ 310/216.009, 216.074; 29/596
  See application file for complete search history.

(56) References Cited

U.S. PATENT DOCUMENTS

| | | | | |
|---|---|---|---|---|
| 5,265,320 A | * | 11/1993 | Greenway | 29/596 |
| 5,859,486 A | * | 1/1999 | Nakahara et al. | 310/216.004 |
| 6,226,856 B1 | * | 5/2001 | Kazama et al. | 29/596 |
| 6,741,005 B2 | * | 5/2004 | Vohlgemuth | 310/216.045 |
| 6,851,175 B2 | * | 2/2005 | Brown et al. | 29/596 |
| 6,941,638 B2 | | 9/2005 | Hartsfield, Jr. | |
| 7,111,380 B2 | | 9/2006 | Sheeran | |
| 7,116,023 B2 | | 10/2006 | Wang | |
| 7,382,075 B2 | | 6/2008 | Wang | |
| 7,414,347 B2 | | 8/2008 | Wang | |
| 7,576,467 B2 | * | 8/2009 | Yamamoto et al. | 310/216.009 |
| 7,578,047 B2 | | 8/2009 | Wang | |
| 7,583,002 B2 | | 9/2009 | Lyle | |
| 7,586,231 B2 | | 9/2009 | Wang | |
| 2007/0096587 A1 | * | 5/2007 | Ionel et al. | 310/218 |
| 2008/0136285 A1 | * | 6/2008 | Tajima et al. | 310/216 |

FOREIGN PATENT DOCUMENTS

| | | | | | |
|---|---|---|---|---|---|
| DE | 10146047 | * | 4/2003 | | H02K 21/02 |
| JP | 11-155263 A | * | 6/1999 | | H02K 15/02 |
| JP | 2008-289309 A | * | 11/2008 | | H02K 15/02 |
| JP | 2010-193715 A | * | 9/2010 | | H02K 15/02 |
| WO | 0245240 | * | 6/2002 | | H02K 15/02 |

OTHER PUBLICATIONS

Machine Translation, Nagai, JP 2010-193715 A, Sep. 2010.*
English Machine Translation, Kagawa et al., JP 2008-289309 A, Nov. 2008.*
English Machine Translation, Yasujima et al., JP 11-155263 A, Jun. 1999.*

* cited by examiner

*Primary Examiner* — Burton Mullins
(74) *Attorney, Agent, or Firm* — Maginot, Moore & Beck, LLP (57) ABSTRACT

An electromagnetic machine has a rotor and a stator core. The stator core has a plurality of radially-extending teeth and a plurality of bridges having opposite ends secured to corresponding teeth. Stator windings are positioned at least partially in slots between the teeth. Each of the bridges is in a compressed configuration and includes a midsection radially offset from the ends. In a method of making an electromagnetic machine, stator windings are wound around the teeth of the stator core while the stator core is in an expanded configuration in which each of the slots is relatively wider and the configuration of the stator core is changed after winding, for example by compressing or otherwise deforming the bridges, to a compressed configuration in which each of the slots is relatively narrower. The bridges hold the teeth in the expanded configuration facilitating high slot fill without using a segmented stator.

14 Claims, 9 Drawing Sheets

FULL ROUND STATOR ASSEMBLY AND ELECTROMAGNETIC MACHINE HAVING HIGH SLOT FILL

FIELD OF INVENTION

The present invention relates generally to electromagnetic machines having a stator including a plurality of stator teeth and stator coil windings wound around the teeth, and more particularly to such machines having a stator adapted to facilitate efficient manufacture of the machine and in which slots between the teeth are filled with a relatively high volume of stator coil windings.

BACKGROUND

As is well-known in the art, electric motors have stator assemblies including a plurality of teeth and stator coil windings wound around each of the teeth so electrical current flowing through the windings can generate magnetic fields to drive rotation of a rotor. It is often desirable to increase the number of times the windings are wrapped around each tooth, but there is only a limited amount of space for windings in the slots between the teeth. Also, some of the equipment used to wind the windings around the teeth has to move through the slots between adjacent stator teeth. As the windings fill up the slots during the winding process, it becomes more difficult to wind the coils on the teeth, particularly at the high speeds required for economical mass production of electric motors.

Because of the limitations of winding equipment, slot fill (the percentage of the volume of the slots between stator teeth that is occupied by stator windings) for full round stator constructions is limited to about 65 percent. Segmented stators have been developed to address this problem. Segmented stators are made of multiple discrete segments, each of which includes one or more teeth. The windings are wrapped around the stator teeth while the segments are separate from one another. In the case of single-tooth segments, the winding equipment is not constrained by any other teeth during the winding process. In the case of multi-tooth segments, the separation of the segments during winding still provides better access to the slots and enables a higher slot fill to be achieved. However, the various stator segments have to be assembled after winding. Moreover, the windings around each tooth of the stator are connected to the windings around other stator teeth and there is a need to provide structure to hold the different segments of a stator in proper position relative to one another during winding. These factors add to the cost and difficulty in manufacturing a motor or other electromagnetic machine using a segmented stator.

SUMMARY

In one aspect the invention includes a stator assembly having a stator core. The stator core has a plurality of radially-extending teeth and a plurality of compressed bridges extending between a corresponding adjacent pair of teeth of said plurality of teeth to space each tooth of the pair of teeth from the other tooth of the pair of teeth by a slot. The bridges have been compressed to reconfigure the stator core from an expanded configuration in which each of the slots between the adjacent pairs of teeth is relatively wider to a compressed configuration in which each of the slots between adjacent pairs of teeth is relatively narrower. The stator assembly has a plurality of stator windings. Each of the stator windings is at least partially positioned in at least one of the slots.

Another aspect of the invention includes an electric motor having a housing, a rotor mounted for rotation relative to the housing, and a stator core. The stator core has a plurality of radially-extending teeth and a plurality of bridges. Each of the bridges has opposite ends secured to corresponding teeth of said plurality of teeth to space the corresponding teeth by corresponding slots. Each of the bridges includes a midsection radially offset from the ends. The motor has stator windings at least partially positioned in the slots between the teeth.

Another aspect of the invention is a method of making a stator assembly for an electromagnetic machine. The method includes stacking a plurality of one-piece stator laminations to form a stator core. Each stator lamination includes a plurality of tooth portions and a plurality of bridge portions. The plurality of tooth portions form a plurality of teeth and the plurality of bridge portions form a plurality of bridges when the laminations are stacked. Each of the bridges extends between corresponding teeth to hold each tooth between adjacent teeth so it is spaced from corresponding adjacent teeth by slots. The method includes winding coils around the teeth of the stator core while the stator core is in a first configuration in which each of the slots is relatively wider and changing the configuration of the stator core after winding to a second configuration in which each of the slots is relatively narrower.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
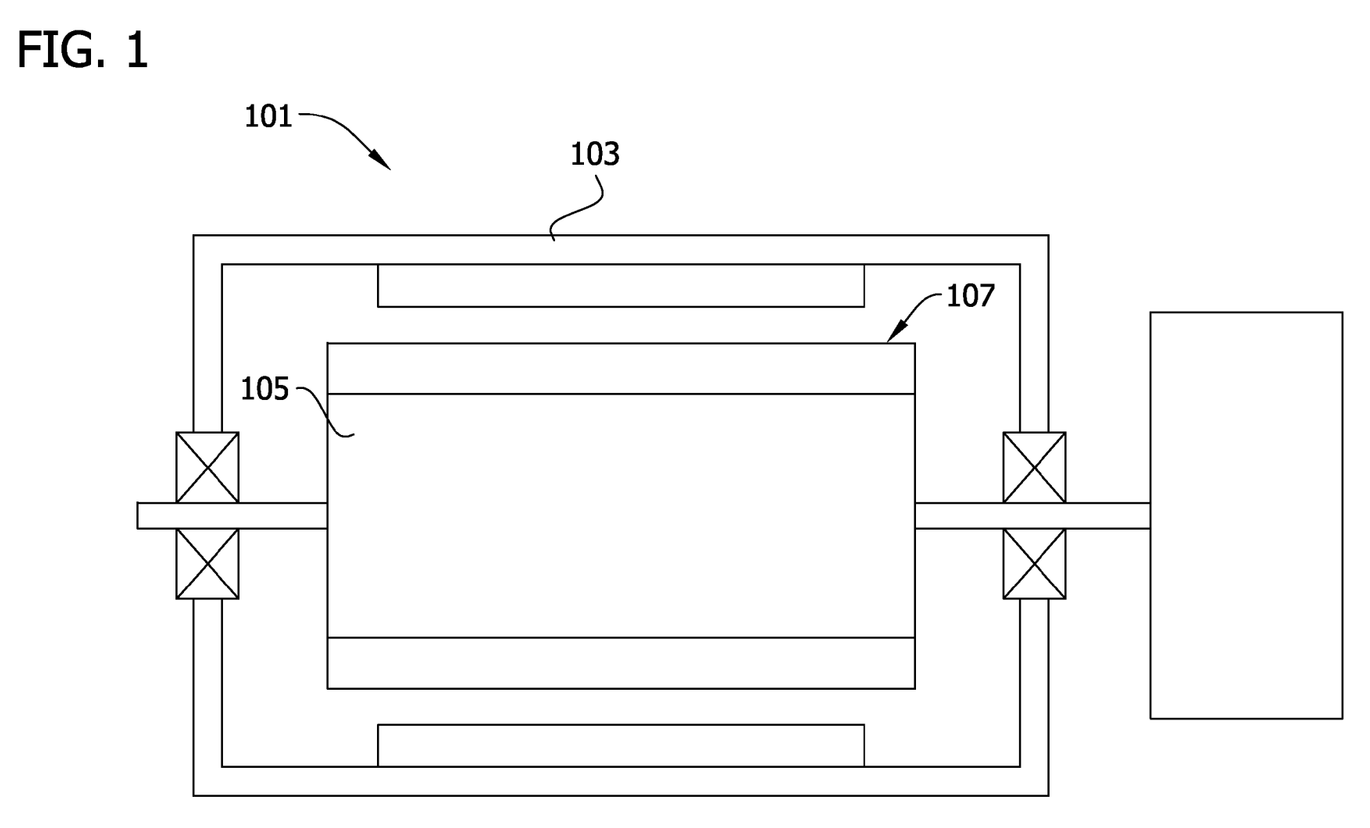
FIG. 1 is a schematic diagram of one embodiment of an electromagnetic machine.

Referring to the drawings, one embodiment of an electromagnetic machine is generally designated by the reference number 101 in FIG. 1. Although the machine 101 in FIG. 1 is an electric motor, it will be recognized by those skilled in the art that other electromagnetic machines, including electric generators are within the scope of the invention.

Figure 2:
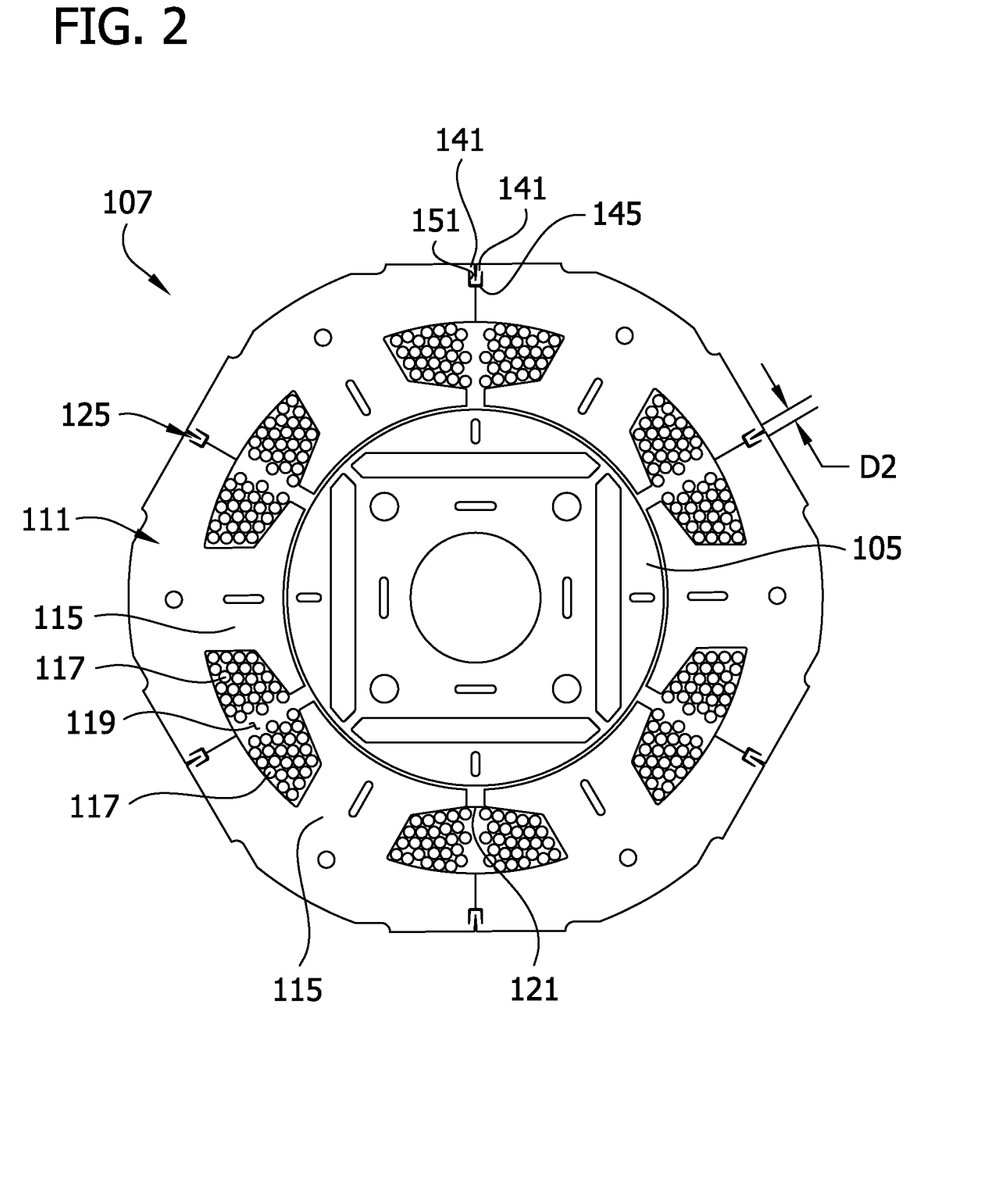
FIG. 2 is a sectional plan of a stator assembly and rotor of the electromagnetic machine.

The motor 101 has a housing 103, a rotor 105 mounted for rotation relative to the housing, and a stator assembly 107. Referring to FIG. 2, the stator assembly 107 includes a stator core 111 having a plurality of radially-extending teeth 115. For example, as illustrated in FIG. 2 the motor 101 has an outer stator core 111 extending around the rotor 105 and the teeth 115 on the stator core extend radially inward toward the rotor. However, it is understood the stator could be an inner stator having teeth extending radially outward toward an outer rotor extending around the stator without departing from the scope of the invention. The stator assembly 107 also has windings 117 at least partially positioned in slots 119 spacing adjacent teeth from one another. As is apparent to those skilled in the art, the windings 117 can be energized so electrical current flowing through the windings creates magnetic fields that drive rotation of the rotor 105.

Figure 3:
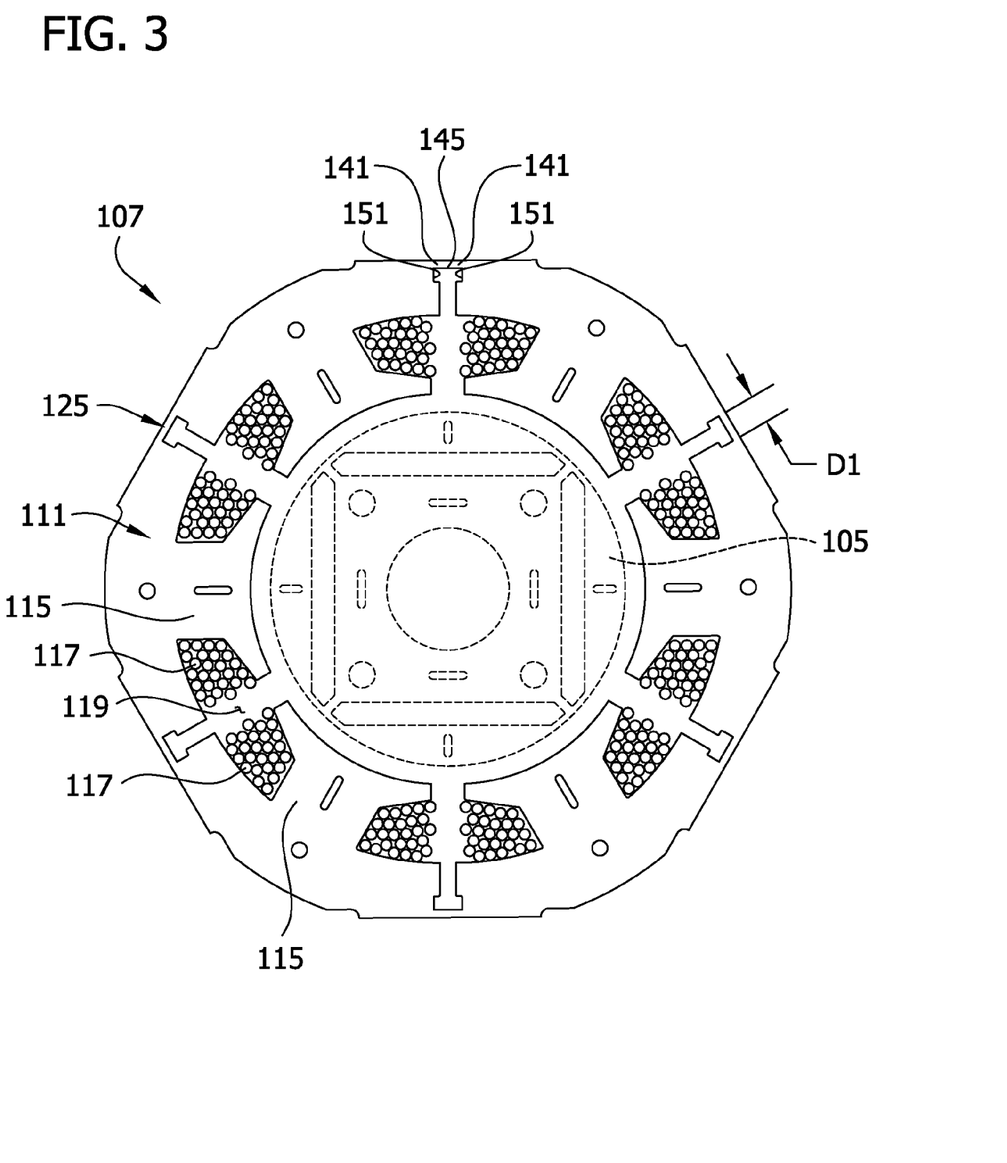
FIG. 3 is a sectional plan of the stator assembly illustrating the stator core in an expanded configuration.

As illustrated in FIGS. 2 and 3, the stator core 111 includes a plurality of bridges 125 connecting the teeth 115 to one another. Each bridge 125 extends from one of the teeth 115 to a corresponding adjacent tooth and provides a link physically connecting the teeth and limiting movement of the teeth relative to one another. When the motor 101 is assembled, the teeth 115 extend away from the bridges 125 toward the rotor 105. The bridges 125 are positioned on an outer perimeter of the stator core 111 and the teeth 115 extend radially inward from the bridges toward the rotor 105. The bridges 125 are adapted to be deformed during assembly of the stator 107 to reconfigure the stator core 111 from an open/expanded configuration (FIG. 3), in which each of the slots 119 between adjacent teeth 115 is relatively wider (e.g., to facilitate winding the windings 117 around the teeth), to a closed/compressed configuration (FIG. 2), in which each of the slots between adjacent teeth is relatively narrower. When the motor 101 is fully assembled, the stator core 111 is in the compressed configuration, which desirably yields a more compact machine.

Figure 4:
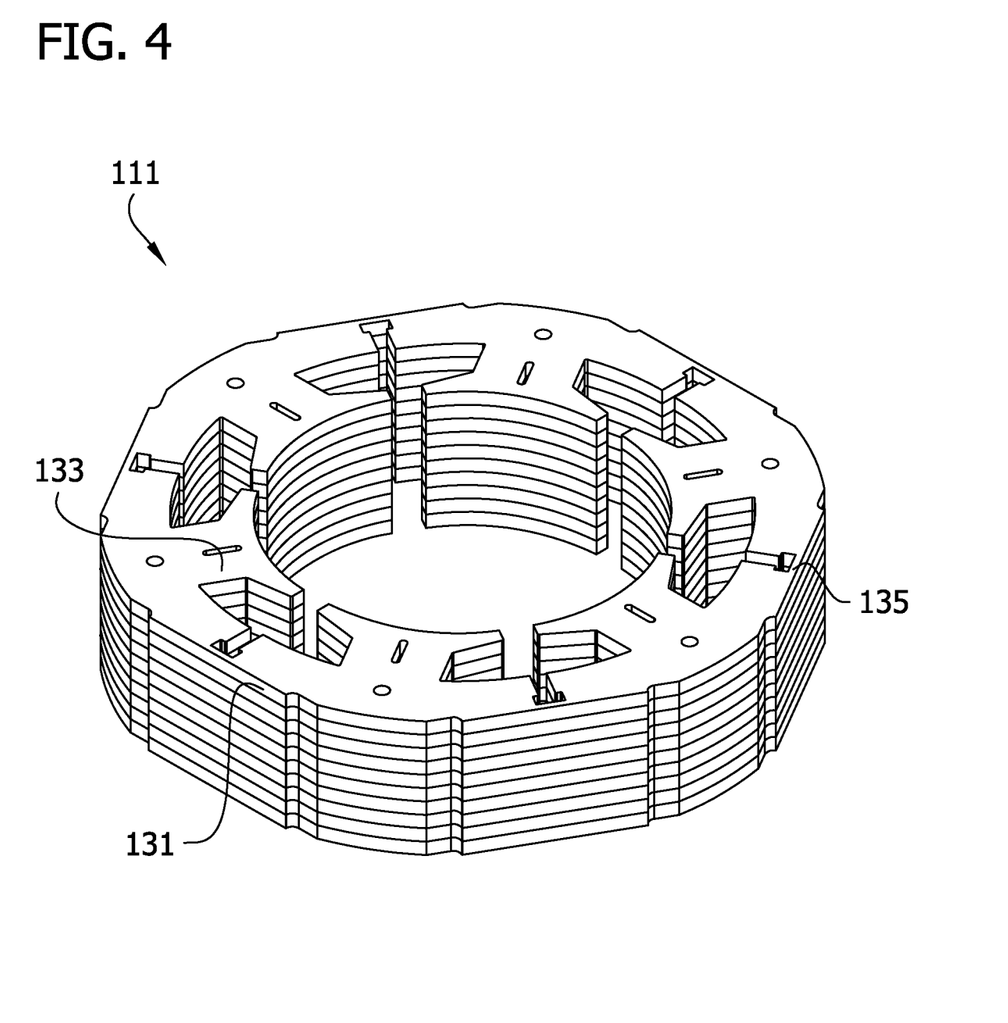
FIG. 4 is a perspective of the stator core.

As illustrated in FIG. 4, the stator core 111 is suitably formed from a plurality of stacked laminations 131 to reduce eddy currents in the stator core 111. The stator core 111 is a full round stator core, meaning the stator includes a ring (e.g., formed by the teeth 115 and bridges 125) extending substantially continuously around the space to be occupied by the rotor 105. Each lamination 131 has a plurality of tooth portions 133 and a plurality of bridge portions 135. The bridge portions 135 and tooth portions 133 are formed integrally as one piece so the bridge portions and teeth portions for each lamination 131 are part of a single unitary body. When the laminations 131 are stacked to form the stator core 111, the tooth portions 133 collectively form the teeth 115 and the bridge portions 135 collectively form the bridges 125. Because the bridges 125 of the illustrated embodiment are formed integrally with the teeth 115, there is no need for an assembly step to connect the bridges to the teeth. Further, the laminations 131 are all identical in the illustrated embodiment, but it is possible one or more laminations can be constructed differently without departing from the scope of the invention. For example, one or more of the bridge portions can be omitted from one or more of the laminations without departing from the scope of the invention.

FIG. 3 illustrates the stator core 111 in an expanded configuration. Each bridge 125 has opposite ends 141 secured to adjacent corresponding teeth 115. As illustrated in FIG. 3, the ends 141 are secured to the sides of the teeth 115 at the outmost ends of the teeth on the outer perimeter of the stator core 111. There are recesses 151 in the sides of the teeth 115 adjacent the ends 141 of the bridges and in radial alignment with the ends 141 of the bridges. For example, as illustrated the recesses 151 are positioned radially inward from the ends 141 of the bridges 125. A midsection 145 of each bridge 125 is positioned between the ends 141 so the midsection of the bridge is aligned linearly with the ends in the expanded configuration. In this configuration, the bridges 125 are in a substantially straight extended configuration and maintain a relatively wide separation between adjacent teeth 115. Also, the distance D1 between the ends 141 of the bridges 125 in the expanded configuration is relatively large. This open/expanded configuration of the stator core 111 facilitates winding coils around the teeth 115 to form the stator windings 117.

FIG. 2 illustrates the stator core 111 in its compressed configuration, in which the bridges 125 have been deformed (e.g. bent until they are plastically deformed) to move the teeth 115 radially inward and reduce the spacing between adjacent teeth. In particular, in reconfiguring the stator core 111, the midsections 145 of the bridges 125 have been displaced radially (e.g., radially inward as in the illustrated embodiment) from the ends 141 of the bridges and the distance D2 between the ends of the bridges has been reduced or eliminated. Rather than extend in a substantially straight manner between the corresponding adjacent teeth 115 each bridge 125 in the compact configuration extends radially into and at least partially fills the corresponding recesses 151. As illustrated in FIG. 2, the sides of the teeth 115 adjoin one another in the compressed configuration and the distance D2 is about zero. However, it is understood that there can be spaces between the teeth in the compressed configuration of the stator core without departing from the scope of the invention.

As illustrated in FIG. 2, the windings 117 of the stator assembly 107 fill a substantial portion of the volume of the slots 119 between adjacent teeth 115. For instance, the "slot fill" is suitably at least about 65 percent, more suitably at least about 75 percent, and still more suitably at least about 85 percent. "Slot fill" is a term of art and refers to the area of the slot 119 occupied by the windings 117 (including the area occupied by the conductive part of the windings and also any insulation) divided by the total usable area of the slot, expressed as a percentage. The boundary between the area inside the usable slot area and the area outside the usable slot area is indicated by 121 in FIG. 2. When calculating slot fill, the space occupied by any insulation as well as interstitial spaces between adjacent turns of the windings are considered as being filled because these can be reduced or eliminated if desired (e.g., using very thin or no insulation to maximize the space occupied by conductive material and/or using windings having square cross sectional shape to reduce or eliminate interstitial spaces).

Figure 5:
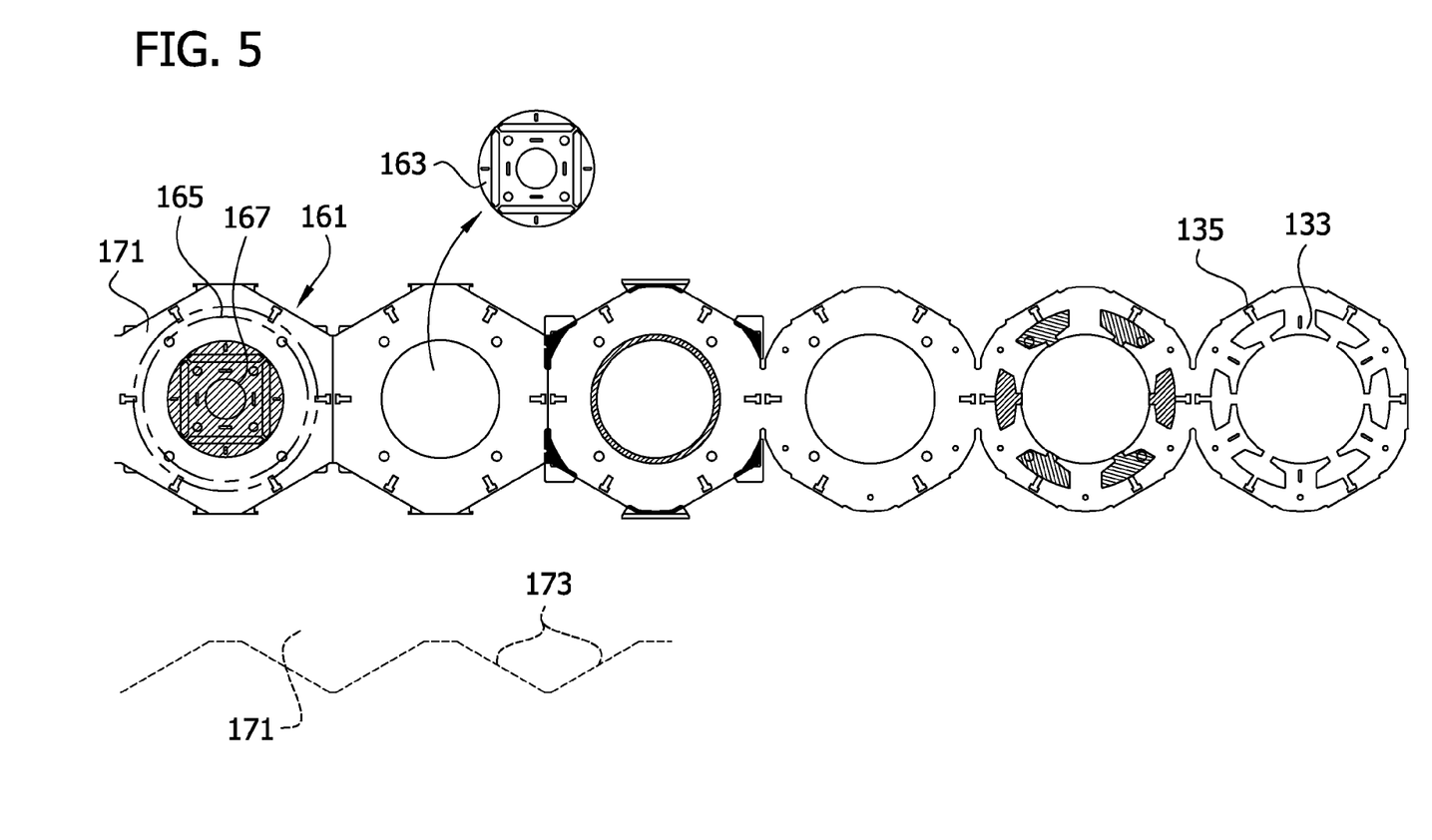
FIG. 5 illustrates a sequence in which stator and rotor laminations are produced from a scroll slit feed stock using a progressive die.

According to one method of manufacturing an electric motor or other electromagnetic machine, a plurality of stator laminations 131 are cut from one or more flat blanks 161, as illustrated in FIG. 5. The stator laminations 131 have an as-cut shape corresponding to the open/expanded configuration of the stator core 111 described above. At least one rotor lamination 163 is cut from the same blank 161 as at least one of the stator laminations 131. As illustrated, for example, the stator lamination 131 is cut from a stator-producing portion 165 of the blank 161 and the rotor lamination 163 is cut from a rotor-producing portion 167 of the blank positioned inside the stator-producing portion. For example, the rotor-producing portion 167 of the blank 161 is suitably completely encircled by the stator-producing portion 165 of the blank. Because the stator laminations 131 are shaped to correspond to the open configuration, there is ample room to fit an entire rotor-producing portion 167 of the blank within (i.e., inside) the inner margin of the stator-producing portion 165. Using the material inside the stator-producing portion 165 of the blank 167 to make the rotor laminations 163 facilitates cutting the stator laminations 131 and rotor laminations 163 from the same blank 161 while minimizing unused scrap material from the blank.

FIG. 5 is a plan view of a series of blanks 161 from which a series of stator and rotor laminations 131, 163 are being cut. The stock material is suitably a scroll slit feed stock. As illustrated in FIG. 5, scroll slit feed stock can be formed by cutting a sheet of steel into strips 171 using zigzag cuts 173 to form portions of the outer circumference of a series of stator-producing portions that remain connected to one another. Multiple strips 171 are suitably cut from a large flat sheet so the stator-producing portions of adjoining strips 171 of scroll slit feed material are longitudinally offset from one another. A portion of one adjoining strip 171 is illustrated in phantom in FIG. 5 to illustrate the longitudinal offset. The use of this scroll slit feed stock can desirably limit the amount of scrap material produced in the process. The laminations 131, 163 are cut by a series of progressive dies (not shown) and each stator lamination in the series illustrated in FIG. 5 is at a different step in the process. Once they have been cut from the blank, it is not important to keep stator and rotor laminations 131, 163 from the same blank 161 or portion thereof together and each may eventually be used to make a different electromagnetic machine without departing from the scope of the invention.

To manufacture the stator assembly 107, a plurality of stator laminations 131 are stacked to form the stator core 211 (FIG. 4). Conductive coils are wound around the teeth 115 of the stator core 111 to form the windings 117 while the stator core is in the open/expanded configuration (FIG. 3), in which each of the slots 119 is relatively wider. Because of the relatively wider spacing between the teeth 111 in the open configuration of the stator core 111, the winding can be more easily wound using high speed winding machines that require a relatively wide space between the teeth in order to operate efficiently. During winding, the bridges 125 hold the teeth 115 in position relative to one another.

After the winding is complete, the configuration of the stator core 111 is changed to the compressed configuration. For example, the bridges 125 can be deformed by pushing the teeth radially inward toward one another. As the stator core 111 deforms into its compressed configuration, the bridges 125 bend so their midsections 145 are displaced radially (e.g., radially inward) from the ends 141 of the bridges. The recesses 151 provide a void that is partially or fully filled by the bridges 125 during the reconfiguration of the stator core 111. Consequently, the recesses 151 facilitate the ability to position the teeth closely adjacent one another in the compact configuration of the stator core 111. As illustrated in FIG. 2, for example, the sides of the teeth 115 can adjoin one another in the compact configuration of the stator core.

Optionally, assembly of the rotor 105 includes stacking a plurality of rotor laminations 163 that are substantially identical to the rotor laminations cut from the blank 161 to form the rotor. The compact stator assembly 107 is suitably combined with a rotor 105 and housing 103 using assembly methods well-known to those skilled in the art to produce the electric motor 101 or other machine.

Figure 6:
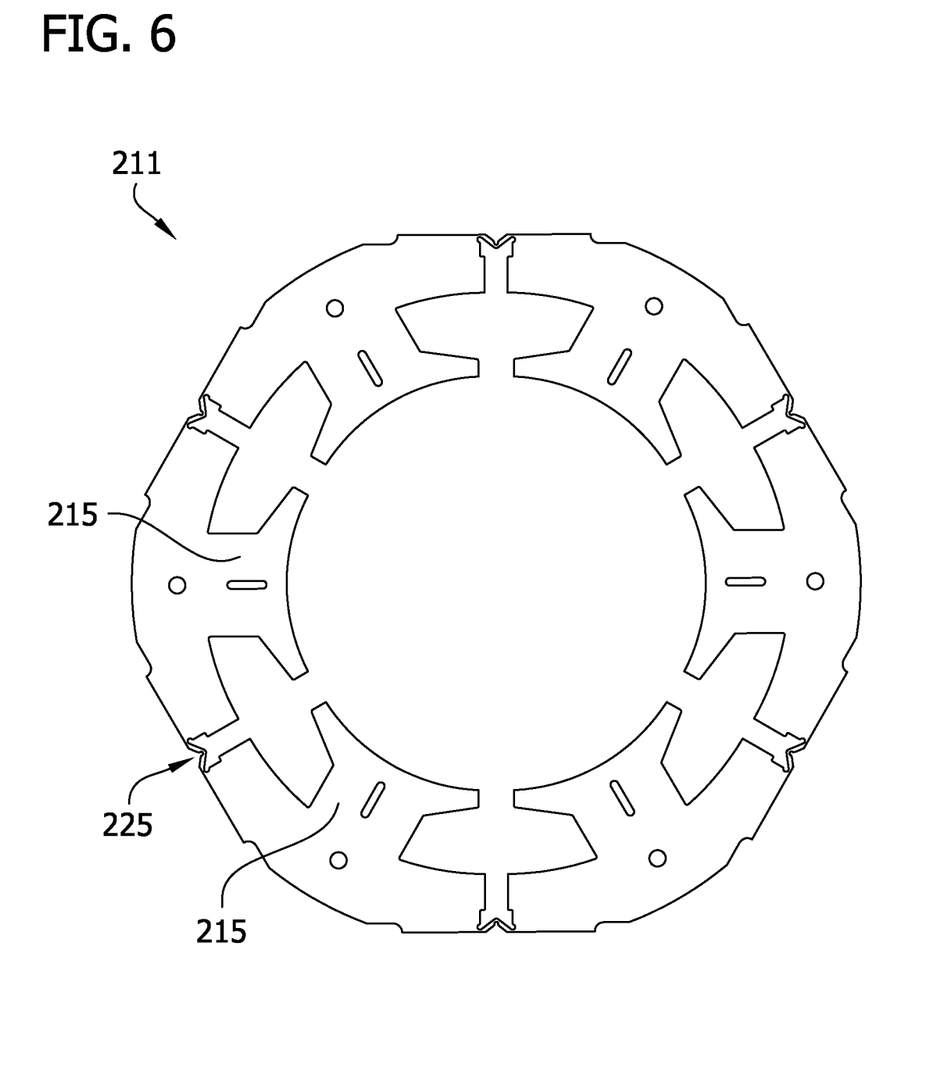
FIG. 6 is a top plan of another embodiment of a stator core illustrating the stator core in a partially expanded configuration.
Figure 6A:
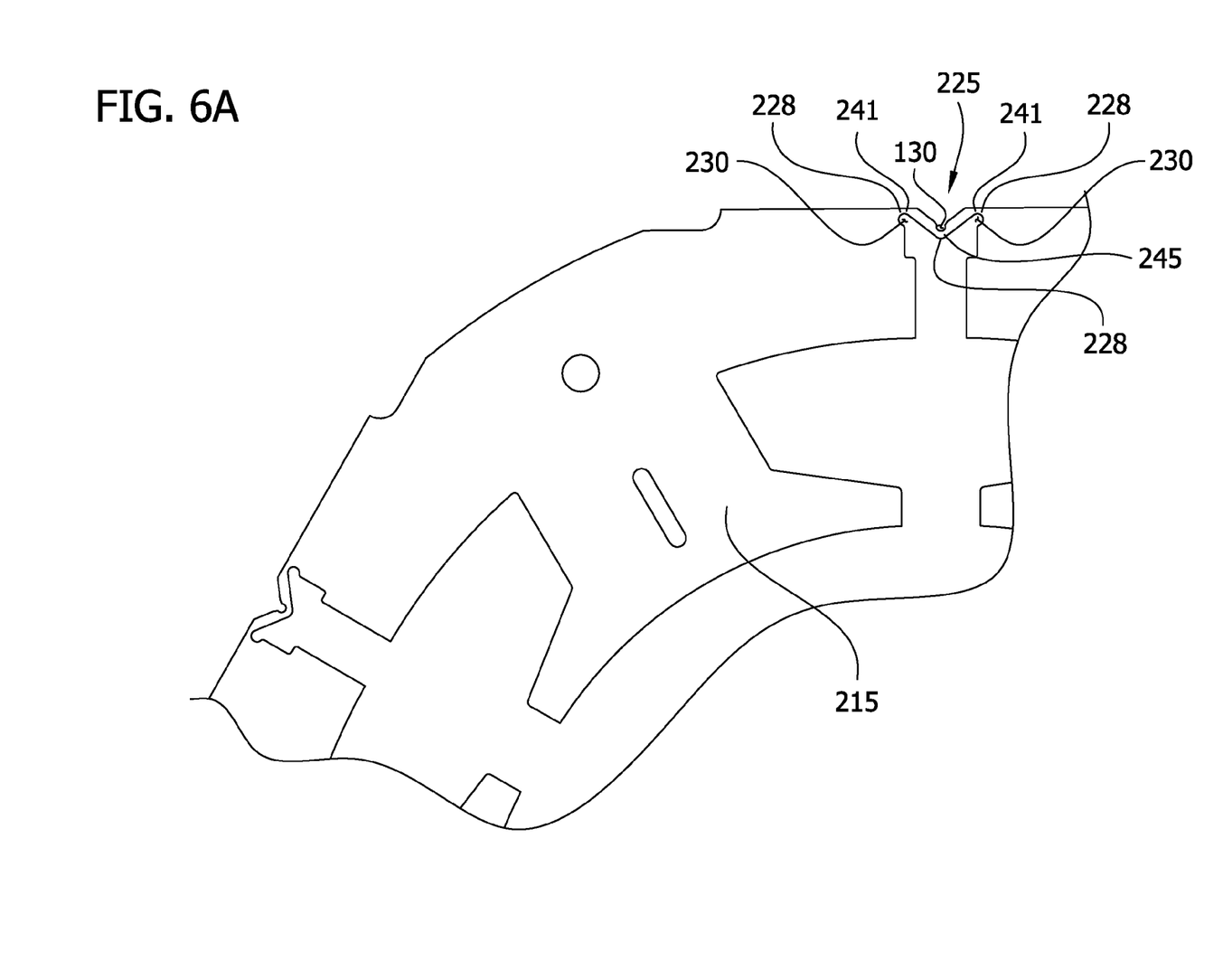
FIG. 6A is an enlarged fragmentary top plan of a portion of the stator core in FIG. 6.
Figure 7:
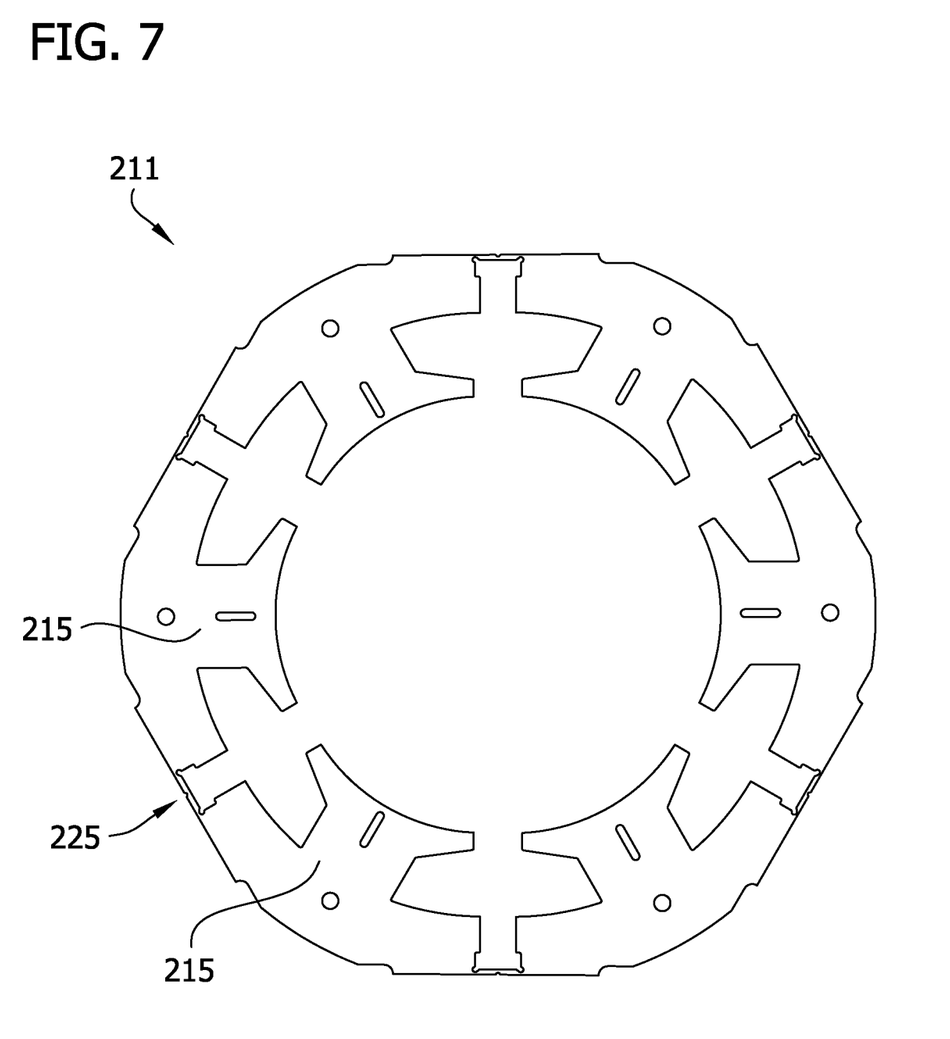
FIG. 7 is a top plan of the stator core shown in FIG. 6 in a fully expanded configuration.
Figure 8:
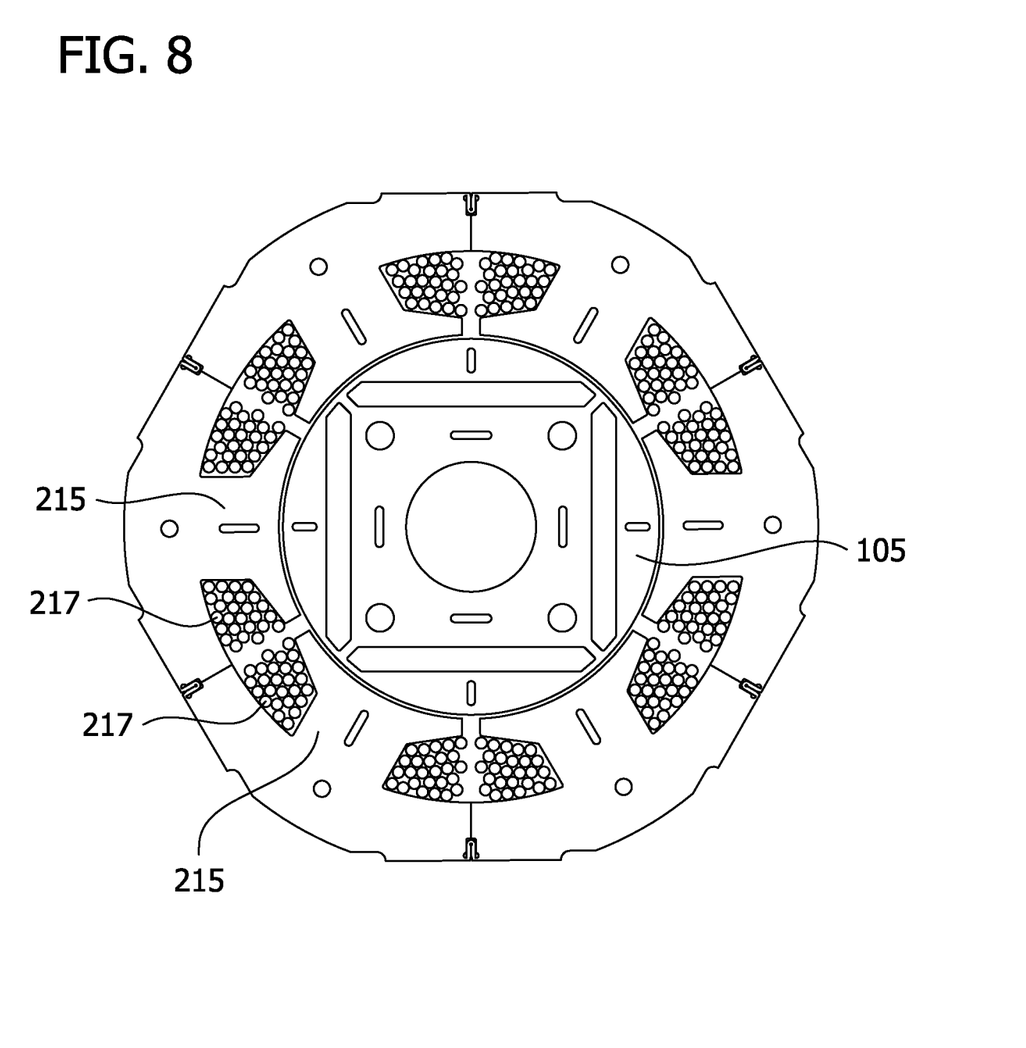
FIG. 8 is a top plan of a stator assembly including the stator core of FIGS. 6 and 7 in a compressed configuration.

FIGS. 6-8 illustrate another embodiment of a stator assembly 207 and stator core 211 of the present invention. Except as noted, the stator assembly 207 and stator core 211 are substantially identical to the stator assembly 107 and stator core 111 described above. As illustrated in FIGS. 6 and 6A, the bridges 225 of the stator core 211 each have one or more living hinges 228 to facilitate bending of the bridge in a controllable manner as the stator core is reconfigured to the compressed configuration. For example, each bridge 225 suitably includes three living hinges 228 including a pair of living hinges at the ends 241 of the bridges and another living hinge at the midpoint 245 of the bridge. The living hinges 228 are suitably formed by cutting notches 230 into the bridge forming portions of the laminations. The notches 230 create a thin strip of material at the hinge 228 and also provide a space into which material at the inner edge of the hinge bend axis can be received.

The stator core 111 is in a partially expanded configuration in FIG. 6. In this configuration, the bridges 225 are not fully extended and the midpoints 245 are displaced radially (e.g., radially inward) from the ends 241 of the bridges. The bridges 225 in the partially expanded configuration are suitably generally V-shaped, as illustrated. FIG. 7 shows the stator core in a fully expanded configuration, in which the bridges 225 are fully extended and the midpoints 245 of the bridges are generally linearly aligned with the ends 241 of the bridges. The stator core 211 is in a relatively compact configuration in the assembled motor, as illustrated in FIG. 8.

The stator assembly 207 can be manufactured according to methods substantially identical to those described above, except as noted. The laminations for the stator core 211 are suitably cut from a progressive die that is modified to result in the living hinges on the bridge forming portions of the laminations. For example, the progressive die can be modified to cut laminations having the same shape as the stator core in the partially expanded configuration illustrated in FIG. 6. In other words, the as-cut shape of the laminations suitably corresponds to the partially expanded configuration of the stator core 211 (FIG. 6) in one embodiment of the manufacturing method. After the laminations are stacked to form the stator core 211, the stator core is suitably reconfigured from the partially expanded configuration of FIG. 6 to the fully expanded configuration of FIG. 7, for example, by pushing radially outward on the teeth and bending the bridges 225 at the hinges 228 to reconfigure the bridges to a fully extended configuration. It is understood the laminations could first be reconfigured into the fully expanded configuration then stacked to form the stator core 211 without departing from the scope of the invention. The windings 217 are suitably wound around the teeth 215 in the fully expanded configuration to facilitate use of efficient high speed winding methods and equipment while at the same time achieving the high slot fill, as described for the stator assembly 107 above. After the winding is complete, the stator core 211 is reconfigured to its compact configuration to produce the stator assembly 207 illustrated in FIG. 8, which is suitably combined with a rotor 105 to make an electromagnetic machine.

Expanding the stator core 211 from the partially expanded configuration to the fully expanded configuration before reconfiguring it to the compressed configuration of the complete stator assembly 207 can provide a couple of advantages. First, the stator laminations have a smaller outer diameter in the partially expanded configuration than they do in the fully expanded configuration. This results in less wasted blank material because smaller width scroll slit feed material can be used and because there is less material in the space between the stator-producing portion of the blank and the rotor producing portion of the blank.

Second, it can be easier to control reconfiguration of the stator core 211 from a fully expanded configuration, in which the bridges 225 are substantially straight (as in FIG. 7), to a compressed configuration. This is because the bridges will have already been deformed along the desired bend lines when the reconfiguration to the more compact configuration begins. If the stator core is reconfigured directly from a configuration in which undeformed straight bridges are bent to reconfigure the stator core to a compressed configuration, it is possible the bridges will buckle in a direction other than that which is intended (e.g., so the midpoints 145 of the bridges 125 described above are displaced radially outward instead of radially inward as intended). In contrast, when the bridges are deformed first to expand them to the straight configuration, the presence of already deformed material along the inner edge of the desired bend lines makes it less likely the bridges 225 will deform (e.g., buckle) in a direction other than that which is intended.

When introducing elements of the present invention or the preferred embodiments thereof, the articles "a", "an", "the", and "said" are intended to mean there are one or more of the elements. The term "comprising", "including", and "having" are intended to be inclusive and mean that there may be additional elements other than the listed elements.

As various changes could be made the above constructions without departing from the scope of the invention, it is intended that all matter contained in the above description and shown in the accompanying drawings shall be interpreted as illustrative and not in a limiting sense.

What is claimed is:

1. A stator assembly comprising:
    a full round stator core comprising a plurality of radially-extending teeth and a plurality of compressed bridges, each compressed bridge of said plurality of compressed bridges having a mid-section radially displaced from a periphery of the full round stator core towards a center of the full round stator core to at least partially fill a recess and a first end and a second end of each compressed bridge being positioned on the periphery of the full round stator core and being displaced from the mid-section of the bridge on a radial that passes through the center of the full round stator core and the mid-section of the bridge, each radially-extending tooth in each adjacent pair of radially-extending teeth in the plurality of radially extending teeth being separated by a slot; and
    a plurality of stator windings, each of said stator windings of the plurality of stator windings being at least partially positioned in at least one of the slots separating one of the adjacent of radially-extending teeth.

2. A stator assembly as set forth in claim 1 wherein the full round stator core is formed from a plurality of stacked laminations, each lamination includes a plurality of tooth portions forming the plurality of radially-extending teeth when stacked with other laminations and a plurality of bridge portions forming the plurality of compressed bridges when stacked with other laminations and the mid-sections are radially displaced towards the center of the full round stator core, and the plurality of bridge portions and the plurality of tooth portions of each lamination are formed integrally as one piece.

3. A stator assembly as set forth in claim 1, each compressed bridge in the plurality of compressed bridges further comprising:
    a living hinge configured to radially displace the mid-section of the bridge from the periphery of the full round stator core into the recess of the bridge.

4. A stator assembly as set forth in claim 1 wherein the windings fill at least about 65 percent of a volume of each of the slots.

5. An electromagnetic machine comprising a stator assembly as set forth in claim 1.

6. An electric motor comprising:
    a housing;
    a rotor mounted for rotation relative to the housing; and
    a full round stator core having a plurality of radially-extending teeth and a plurality of compressed bridges, each compressed bridge in the plurality of compressed bridges having a mid-section radially displaced from a periphery of the full round stator core towards a center of the full round stator core to at least partially fill a recess and a first end and a second end of each compressed bridge being positioned on the periphery of the full round stator core and being displaced from the mid-section of the bridge on a radial that passes through the center of the full round stator core and the mid-section of the bridge, each radially-extending tooth in each adjacent pair of radially-extending teeth in the plurality of radially-extending teeth being separated by a slot; and
    a plurality of stator windings, each stator winding in the plurality of stator windings being at least partially positioned in at least one of the slots separating one of the adjacent pairs of radially-extending teeth.

7. An electric motor as set forth in claim 6 wherein each compressed bridge in the plurality of compressed bridges consists essentially of a plastically deformed material.

8. An electric motor as set forth in claim 6, each compressed bridge in the plurality of compressed bridges further comprising:
    a hinge configured to radially displace the mid-section of the bridge from the periphery of the full round stator core into the recess of the bridge.

9. An electric motor as set forth in claim 6 wherein the stator windings fill at least about 65 percent of a volume of each of the slots.

10. An electric motor as set forth in claim 6 wherein the full round stator core is formed from a plurality of stacked laminations, each lamination includes a plurality of tooth portions forming the plurality of radially-extending teeth when stacked with other laminations and a plurality of bridge portions forming the plurality of compressed bridges when stacked with other laminations and the mid-sections are radially displaced from the periphery of the full round stator core towards the center of the full round stator core to at least partially fill the recesses with the mid-sections and the first end and the second end of each compressed bridge are positioned on the periphery of the full round stator core on a radial that passes through the center of the full round stator core and the mid-section of the bridge, and the plurality of bridge portions and the plurality of tooth portions of each lamination are formed integrally as one piece.

11. An electric motor as set forth in claim 6 wherein the full round stator core extends around a perimeter of the rotor.

12. A method of making a stator assembly for an electromagnetic machine, the method comprising:
    stacking a plurality of one-piece stator laminations to form a full round stator core, each stator lamination including a plurality of tooth portions and a plurality of bridge portions, the plurality of tooth portions forming a plurality of teeth and the plurality of bridge portions forming a plurality of bridges when the laminations are stacked, each bridge in the plurality of bridges having a mid-section on a periphery of the full round stator core that is between a first end and a second end of the bridge that are also positioned on the periphery of the full round stator core and each mid-section of each bridge in the plurality of bridges being adjacent a recess in each bridge, each tooth of each adjacent pair of teeth in the plurality of teeth being spaced from the other tooth in the adjacent pair of teeth by a slot;
    winding coils around the teeth of the full round stator core while the full round stator core is in a first configuration in which each of the slots has a first width; and
    radially moving the mid-section of each bridge towards a center of the full round stator core to at least partially fill the recess with the mid-section and to move the first end and the second end onto a radial that extends from the center of the full round stator core to the first end and the second end through the mid-section in the recess, the radial movement of the mid-sections reducing the width of the slots to a second width that is less than the first width.

13. A method as set forth in claim 12 further comprising:
cutting at least one of said plurality of stator laminations out of a blank; and
cutting a rotor lamination out of the blank,
wherein the stator lamination is cut from a stator-producing portion of the blank and the rotor lamination is cut from a rotor-producing portion of the blank positioned inside the stator-producing portion.

14. A method as set forth in claim 13 wherein the blank from which the stator and rotor laminations are cut is part of a scroll slit feed stock.

\* \* \* \* \*